United States Patent
Niihata et al.

(10) Patent No.: US 11,756,436 B2
(45) Date of Patent: Sep. 12, 2023

(54) CONTROL DEVICE, PROGRAM, AND CONTROL METHOD

(71) Applicant: NTT DOCOMO, INC., Tokyo (JP)

(72) Inventors: Kaori Niihata, Tokyo (JP); Tadao Takami, Tokyo (JP); Koji Ishii, Tokyo (JP); Hiroshi Kawakami, Tokyo (JP); Yuichiro Segawa, Tokyo (JP); Yasuhiro Kitamura, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 73 days.

(21) Appl. No.: 17/433,406

(22) PCT Filed: Jan. 24, 2020

(86) PCT No.: PCT/JP2020/002460
§ 371 (c)(1),
(2) Date: Aug. 24, 2021

(87) PCT Pub. No.: WO2020/230371
PCT Pub. Date: Nov. 19, 2020

(65) Prior Publication Data
US 2022/0139237 A1    May 5, 2022

(30) Foreign Application Priority Data
May 10, 2019  (JP) .................. 2019-089813

(51) Int. Cl.
*H04W 72/00*     (2023.01)
*G08G 5/00*      (2006.01)
(Continued)

(52) U.S. Cl.
CPC ......... *G08G 5/0069* (2013.01); *B64C 39/024* (2013.01); *H04W 72/542* (2023.01);
(Continued)

(58) Field of Classification Search
CPC .. G08G 5/0069; H04W 72/542; H04W 88/06; B64C 39/024; B64U 2101/20; G05D 1/104
See application file for complete search history.

(56) References Cited

U.S. PATENT DOCUMENTS

| | | | | |
|---|---|---|---|---|
| 2014/0293852 | A1* | 10/2014 | Watanabe | H04W 52/0277 370/311 |
| 2017/0069214 | A1* | 3/2017 | Dupray | G08G 5/0008 |
| 2020/0111372 | A1* | 4/2020 | Yamada | G08G 5/0091 |

FOREIGN PATENT DOCUMENTS

| | | | | |
|---|---|---|---|---|
| JP | 2014-204194 A | | 10/2014 | |
| WO | WO-2018020607 A1 | * | 2/2018 | ........... B64C 39/024 |
| WO | WO-2020059310 A1 | * | 3/2020 | ............. B64C 19/02 |

OTHER PUBLICATIONS

International Search Report issued in corresponding PCT Application No. PCT/JP2020/002460, dated Mar. 24, 2020.

* cited by examiner

Primary Examiner — Khai M Nguyen
(74) Attorney, Agent, or Firm — DILWORTH IP, LLC

(57) ABSTRACT

Setting unit performs the setting of each of the operating modes of a plurality of aerial vehicles on the basis of communication quality information of the planned route of the plurality of aerial vehicles that fly in a group. Specifically, setting unit firstly specifies the planned positions and periods in which each aerial vehicle is to fly from the flight plan information of the plurality of aerial vehicles that fly in a group. Next, setting unit specifies a communication quality of first wireless communication unit of each aerial vehicle in each position and each period from the communication quality information that represents the communication quality in the specified positions and periods. Then, setting unit specifies an operating mode setting schedule of main unit (Continued)

mode and auxiliary unit mode, which sets an aerial vehicle having a specified communication quality, and sets the remaining aerial vehicles as auxiliary units.

10 Claims, 3 Drawing Sheets

(51) Int. Cl.
*B64C 39/02* (2023.01)
*H04W 72/542* (2023.01)
*G05D 1/10* (2006.01)
*H04W 88/06* (2009.01)
*B64U 101/20* (2023.01)

(52) U.S. Cl.
CPC ......... *B64U 2101/20* (2023.01); *G05D 1/104* (2013.01); *H04W 88/06* (2013.01)

CONTROL DEVICE, PROGRAM, AND CONTROL METHOD

TECHNICAL FIELD

The present invention pertains to a communication technique in an aerial vehicle.

BACKGROUND

Use of unmanned aerial vehicles referred to as drones is becoming widespread. When a plurality of such aerial vehicles fly in a group, generally one of the plurality of aerial vehicles serves as a main unit, collects data from other aerial vehicles and transmits the data to the ground. For example, Japanese Patent Application No. JP2014-204194 discloses an arrangement in which a main unit is selected from among a plurality of terminal devices on the basis of information such as reception quality, remaining battery power, or the like, and the terminal device selected as the main unit brings together data collected from other terminal devices and transmits the data to a relay station.

In the configuration disclosed in Japanese Patent Application No. JP2014-204194, for an aerial vehicle that is used on the ground and does not fly through the air a terminal device is not mounted thereto.

SUMMARY OF INVENTION

A purpose of the present invention is to appropriately control the operating mode of each aerial vehicle, when any of a plurality of aerial vehicles collects data from another aerial vehicle and transmits the data.

The present invention provides a control device comprising: a setting unit configured to set, for each of aerial vehicles, an operating mode of an aerial vehicle to a first operating mode or a second operating mode, the aerial vehicle comprising a first wireless communication unit configured to perform wireless communication via a communication network and a second wireless communication unit configured to perform wireless communication without use of the communication network, the first operating mode being an operating mode in which the aerial vehicle sends data generated in the aerial vehicle and data received from another aerial vehicle, by use of the second wireless communication unit, to a data processing device by use of the first wireless communication unit, the second operating mode being an operating mode in which the aerial vehicle sends, by use of the second wireless communication unit, data generated in the aerial vehicle to another aerial vehicle; a plan acquisition unit configured to acquire, for each of the aerial vehicles, flight plan information indicative of a planned flight location and a planned flight time; and a communication quality acquisition unit configured to acquire, for each of sets of a location and a time, communication quality information indicative of a quality of wireless communication using the communication network, wherein the setting unit is configured to set, for each of the aerial vehicles, an operating mode of an aerial vehicle to the first operating mode or the second operating mode based on communication quality information that corresponds to flight plan information acquired for the aerial vehicle.

The setting unit may be configured, when determining that an aerial vehicle operating in the first operating mode satisfies a condition for possible deviation of flight of the aerial vehicle from flight plan information acquired for the aerial vehicle, to determine whether to change an operating mode of the aerial vehicle.

The condition may be that the aerial vehicle operating in the first operating mode has a malfunction or a failure.

The condition may be that the aerial vehicle operating in the first operating mode has a problem with flight in an airspace prepared for the aerial vehicle.

The condition may be that the aerial vehicle operating in the first operating mode has a problem with communication using a first wireless communication unit of the aerial vehicle in an airspace prepared for the aerial vehicle.

The condition may be that a method of controlling the aerial vehicle operating in the first operating mode has been changed from automatic control to manual control.

The setting unit may be configured to: before setting an operating mode of a first aerial vehicle operating in the first operating mode to the second operating mode, set an operating mode of a second aerial vehicle operating in the second operating mode to a third operating mode in which the second aerial vehicle receives data from another aerial vehicle by use of second wireless communication unit of the second aerial vehicle; setting the operating mode of the first aerial vehicle operating in the first operating mode to the second operating mode; and setting the operating mode of the second aerial vehicle operating in the third operating mode to the first operating mode.

The setting unit may be configured to: before setting an operating mode of a first aerial vehicle operating in the first operating mode to the second operating mode, set each of operating modes of second aerial vehicles to a fourth operating mode in which each of the second aerial vehicles temporarily stores data generated in each of the second aerial vehicles; setting the operating mode of the first aerial vehicle operating in the first operating mode to the second operating mode; setting an operating mode of one of the second aerial vehicles operating in the fourth operating mode to the first operating mode; and setting an operating mode of another one of the second aerial vehicles operating in the fourth operating mode to the second operating mode.

The present invention also provides a program for causing a computer to function as: a setting unit configured to set, for each of aerial vehicles, an operating mode of an aerial vehicle to a first operating mode or a second operating mode, the aerial vehicle comprising a first wireless communication unit configured to perform wireless communication via a communication network and a second wireless communication unit configured to perform wireless communication without use of the communication network, the first operating mode being an operating mode in which the aerial vehicle sends data generated in the aerial vehicle and data received from another aerial vehicle by use of the second wireless communication unit to a data processing device by use of the first wireless communication unit, the second operating mode being an operating mode in which the aerial vehicle sends, by use of the second wireless communication unit, data generated in the aerial vehicle to another aerial vehicle; a plan acquisition unit configured to acquire, for each of the aerial vehicles, flight plan information indicative of a planned flight location and a planned flight time; and a communication quality acquisition unit configured to acquire, for each of sets of a location and a time, communication quality information indicative of a quality of wireless communication using the communication network, wherein the setting unit is configured to set, for each of the aerial vehicles, an operating mode of an aerial vehicle to the first operating mode or the second operating mode based on communication quality information that corresponds to flight plan information acquired for the aerial vehicle.

The present invention also provides a control method comprising: acquiring, for each of aerial vehicles, flight plan information indicative of a planned flight location and a planned flight time, each of the aerial vehicle comprising a first wireless communication unit configured to perform wireless communication via a communication network and a second wireless communication unit configured to perform wireless communication without use of the communication network; acquiring, for each of sets of a location and a time, communication quality information indicative of a quality of wireless communication using the communication network; setting, for each of the aerial vehicles, an operating mode of an aerial vehicle to the first operating mode or the second operating mode based on communication quality information that corresponds to flight plan information acquired for the aerial vehicle, wherein: the first operating mode is an operating mode in which an aerial vehicle sends data generated in the aerial vehicle and data received from another aerial vehicle by use of a second wireless communication unit of the aerial vehicle to a data processing device by use of a first wireless communication unit of the aerial vehicle; and the second operating mode is an operating mode in which an aerial vehicle sends, by use of a second wireless communication unit of the aerial vehicle, data generated in the aerial vehicle to another aerial vehicle.

According to the present invention, the operating mode of each aerial vehicle can be appropriately controlled when any of a plurality of aerial vehicles collects data from another aerial vehicle and transmits the data.

DETAILED DESCRIPTION

Figure 1:
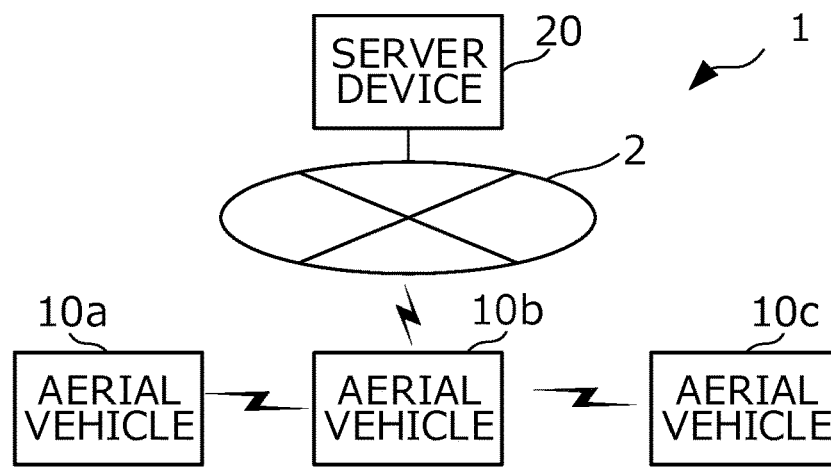
FIG. 1 is a drawing illustrating one example of the configuration of a flight control system according to the present invention.

FIG. 1 is a drawing illustrating one example of the configuration of a flight control system 1. Flight control system 1 comprises, for example, unmanned aerial vehicles 10a, 10b, and 10c referred to as drones, a server device 20, and a communication network 2 that communicably connects the aerial vehicles and server device 20. Server device 20 functions as a control device that controls the operating modes of aerial vehicles 10a, 10b, and 10c, while functioning as a processing device that processes data acquired from aerial vehicles 10a, 10b, and 10c. Communication network 2 is a wireless communication network such as long-term evolution (LTE). A plurality of aerial vehicles 10 exist. FIG. 1 illustrates three aerial vehicles 10a, 10b, and 10c, but the number of aerial vehicles may be fewer or more. Aerial vehicle 10 may be an aerial vehicle that flies in accordance with the operation by an operator of a maneuvering terminal (not illustrated) (that is, manual control flight), an aerial vehicle that flies autonomously under the management of a flight management device (not illustrated) (that is, automatic control flight), or an aerial vehicle that adopts both the manual control flight and automatic control flight. In the following explanation, aerial vehicle 10 refers to each of a plurality of aerial vehicles.

Aerial vehicles 10a, 10b, and 10c fly in a group while maintaining a distance from one another that is within a threshold value. At this time, any of the plurality of aerial vehicles 10 collects data from another aerial vehicle 10 and transmits the data to server device 20. Server device 20 processes the data received from aerial vehicle 10.

Figure 2:
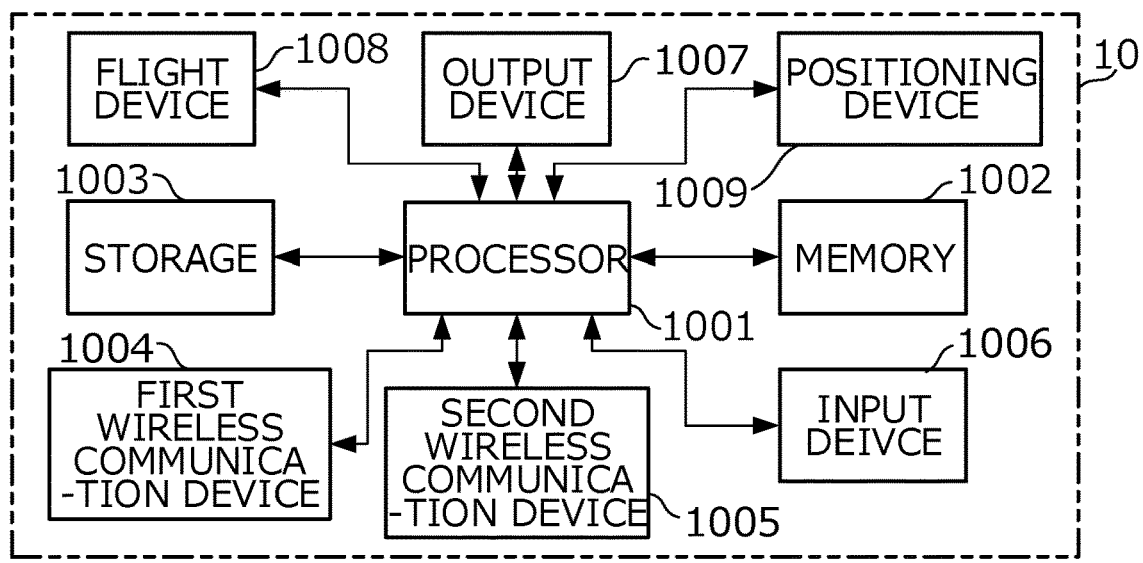
FIG. 2 is a drawing illustrating the hardware configuration of an aerial vehicle according to the present invention.

FIG. 2 is a drawing illustrating the hardware configuration of aerial vehicle 10. Aerial vehicle 10 is physically configured as a computer device including a processor 1001, a memory 1002, storage 1003, a first wireless communication device 1004, a second wireless communication device 1005, an input device 1006, an output device 1007, a flight device 1008, a positioning device 1009, buses that connect the aforementioned devices, a battery (not illustrated), and the like. Each of the devices is operated by power supplied from the battery (not illustrated). In the following explanation, the term "device" may be replaced with circuit, unit, or the like. The hardware configuration of aerial vehicle 10 may be configured so as to include one or a plurality of each of the illustrated devices, or configured so as not to include some of the devices.

Each of the functions in aerial vehicle 10 is realized by means of processor 1001 performing an operation by having hardware such as processor 1001 or memory 1002 read predetermined software (program) and controlling communication by communication device 1004, controlling the reading and/or writing of data from/to memory 1002 and storage 1003, or the like.

Processor 1001 controls the entire computer by operating an operating system, for example. Processor 1001 may comprise a central processing unit (CPU) including an interface with peripheral devices, a control device, an operation device, a register, and the like. Moreover, a baseband signal processing unit, a call processing unit, or the like may be realized by processor 1001, for example.

Processor 1001 reads a program (program code), a software module, data, and the like from storage 1003 and/or communication device 1004 to memory 1002, and executes each type of processing in compliance therewith. For the program, a program that causes a computer to execute at least some of the following operations is used. The function block of aerial vehicle 10 may be realized by a control program that is stored in memory 1002 and operated in processor 1001. Each type of processing may be executed by one processor 1001, or executed simultaneously or consecutively by two or more processors 1001. Processor 1001 may be mounted on one or more chip. Moreover, a program may be transmitted from communication network 2 to aerial vehicle 10 via an electronic communication circuit.

Memory 1002 is a recording medium capable of being read by a computer, and may comprise one or more of a read-only memory (ROM), an erasable programmable ROM (EPROM), an electrically erasable programmable ROM (EEPROM), a random access memory (RAM), and the like, for example. Memory 1002 may be referred to as a register, a cache, a main memory (main storage device), or the like. Memory 1002 is capable of storing a program (program code), a software module, or the like, which can be executed to realize the method pertaining to the present embodiment.

Storage 1003 is a recording medium capable of being read by a computer, and may comprise one or more of an optical disk such as a compact disc ROM (CD-ROM), a hard disk drive, a flexible disk, a magneto-optical disk (for example, a compact disk, a digital multipurpose disk, a Blu-ray (registered trademark) disk, a smart card, a flash memory (for example, a card, a stick, a key drive), a Floppy (registered trademark) disk, a magnetic strip, and the like, for example. Storage 1003 may be referred to as an auxiliary storage device. Storage 1003 stores information pertaining to the attributes of aerial vehicle 10, such as identification information of aerial vehicle 10, flight plan identification information, and the like, for example.

First wireless communication device 1004 is hardware (transmission/receiving device) for communicating with a remote ground via communication network 2, and includes an antenna, a communication module, or the like that complies with LTE, for example. First wireless communication device 1004 is mainly used for aerial vehicle 10 to communicate with server device 20.

Second wireless communication device 1005 is hardware (transmission/receiving device) for wirelessly communicating at a relatively short distance without the use of communication network 2, and includes an antenna, a communication module, or the like that complies with a wireless local area network (LAN) and/or Bluetooth (registered trademark), for example. Second wireless communication device 1005 is mainly used for aerial vehicle 10 to communicate with another aerial vehicle 10.

Input device 1006 is a device (for example, a key, a microphone, a switch, a button, a sensor, a camera, etc.) that accepts external input. For example, if input device 1006 is a camera, input device 1006 generates imaging data showing a captured image. Moreover, if, for example, input device 1006 is a sensor, input device 1006 generates sensing data showing the results of sensing. Output device 1007 is a device (for example, a display, a speaker, an LED lamp, etc.) that outputs to the exterior.

Flight device 1008 is a mechanism for causing aerial vehicle 10 to fly in the air, and includes a propeller, and a motor and a drive mechanism for driving the propeller, for example. Furthermore, flight device 1008 includes, for example, a group of sensors including a rotation speed sensor that detects the rotation speed of the motor, a sensor that detects a value pertaining to the input/output of current, voltage, or the like (for example, a remaining power sensor of a battery), gyro sensor, an acceleration sensor, a pressure (altitude) sensor, a magnetic (compass) sensor, an ultrasonic sensor, and the like. The flight direction and flight speed of aerial vehicle 10 are specified according to the detection results of the aforementioned sensors.

Positioning device 1009 measures the three-dimensional position of aerial vehicle 10. Positioning device 1009 is a global positioning system (GPS) receiving device, for example, and measures the position of aerial vehicle 10 on the basis of GPS signals received from a plurality of satellites. The position of aerial vehicle 10 is specified according to the positioning results of the positioning device.

Each of the devices such as processor 1001 and memory 1002 are connected by a bus for communicating information. The bus may comprise a single bus, or buses that differ for each connection between devices.

Aerial vehicle 10 may comprise hardware such as a microprocessor, a digital signal processor (DSP), an application specific integrated circuit (ASIC), a programmable logic device (PLD), and a field programmable gate array (FPGA), and some or all of each functional block may be realized by the aforementioned hardware. For example, processor 1001 may be mounted using one or more of the aforementioned hardware.

Figure 3:
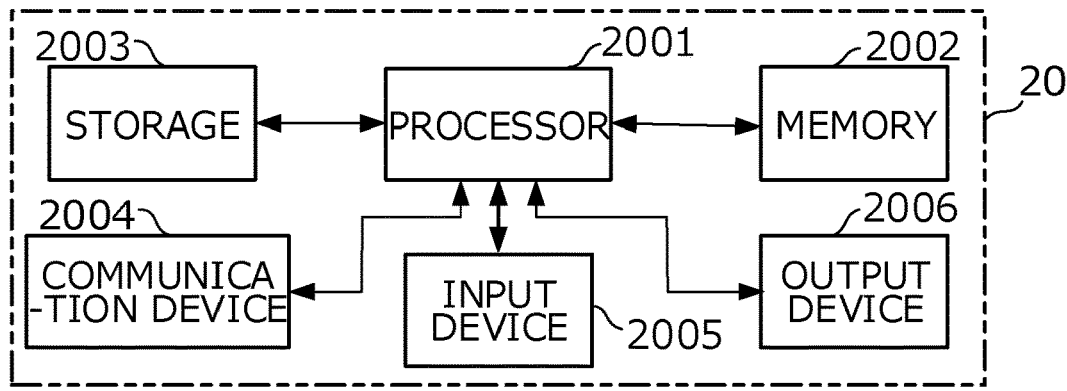
FIG. 3 is a drawing illustrating the hardware configuration of a server device according to the present invention.

FIG. 3 is a drawing illustrating the hardware configuration of a server device 20. Server device 20 is physically configured as a computer device including a processor 2001, a memory 2002, a storage 2003, a communication device 2004, an input device 2005, an output device 2006, buses that connect the aforementioned devices, and the like. Each of the functions in server device 20 is realized by means of processor 2001 performing an operation by having hardware such as processor 2001 or memory 2002 read predetermined software (program) and controlling communication by communication device 2004, controlling the reading and/or writing of data from/to memory 2002 and storage 2003, or the like. In terms of hardware, processor 2001, memory 2002, storage 2003, input device 2005, output device 2006, and the buses that connect the devices are similar to processor 1001, memory 1002, storage 1003, input device 1006, output device 1007, and the buses that connects the devices, explained in relation to aerial vehicle 10, and thus explanation thereof is omitted. Communication device 1004 is hardware (transmission/receiving device) for performing communication via communication network 2, and is also referred to as a communication network device, a communication network controller, a communication network card, a communication module, or the like, for example.

Figure 4:
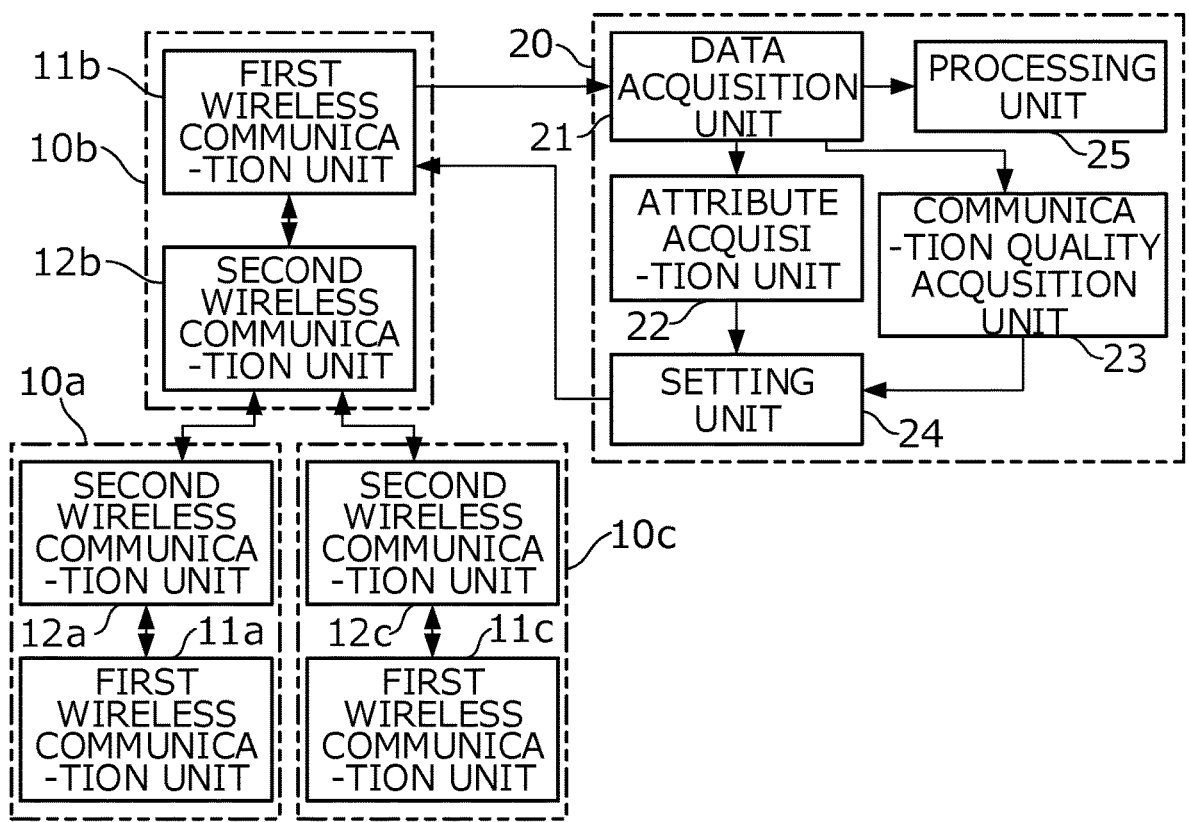
FIG. 4 is a drawing illustrating one example of the functional configuration of a flight control system according to the present invention.

FIG. 4 is a drawing illustrating one example of the functional configuration of a flight control system 1. In Aerial vehicle 10*b*, first wireless communication unit 11*b* has a function that is realized by first wireless communication device 1004 illustrated in FIG. 2, and performs wireless communication via communication network 2. Second wireless communication unit 12*b* has a function that is realized by second wireless communication device 1005 illustrated in FIG. 2, and performs wireless communication without the use of communication network 2. Similarly, in aerial vehicles 10*a* and 10*c*, first wireless communication units 11*a* and 11*c* perform wireless communication via communication network 2, and second wireless communication units 12*a* and 12*c* perform wireless communication without the use of communication network 2. In the following explanation, first wireless communication unit 11 or second wireless communication unit 12 refers to a first wireless communication unit or second wireless communication unit that has the same configuration in all of aerial vehicles 10.

The example in FIG. 4 exemplifies a case in which aerial vehicle 10*b* collects data from other aerial vehicles 10*a* and 10*c* and transmits the data to server device 20. Here, two operating modes exist for each of aerial vehicles 10. The first operating mode (hereafter referred to as main unit mode) is an operating mode that transmits, to server device 20 using first wireless communication unit 11, data generated in host aerial vehicle 10 and data received by second wireless communication unit 12 from another aerial vehicle 10 (aerial vehicle 10 operating in auxiliary unit mode). The second operating mode (hereafter referred to as auxiliary unit mode) is an operating mode that transmits, to another aerial vehicle 10 (aerial vehicle 10 operating in main unit mode) using second wireless communication unit 12, data generated in host aerial vehicle 10. That is, in the example in FIG. 4, aerial vehicle 10*b* operates in main unit mode and aerial vehicles 10*a* and 10*c* operate in auxiliary unit mode. Hereafter, aerial vehicles operating in main unit mode are referred to as main units, and aerial vehicles operating in auxiliary unit mode are referred to as auxiliary units. A plurality of auxiliary units communicate with one main unit via second wireless communication unit 12. Moreover, setting a given aerial vehicle from main unit mode to auxiliary unit mode and simultaneously setting another aerial vehicle from auxiliary unit mode to main unit mode is referred to as switching of main unit. The setting of such main device mode/auxiliary device mode is performed using the communication quality of wireless communication via network 2 as a reference. From among a plurality of aerial vehicles 10 that fly in a group, aerial vehicles 10 having a communication quality that is equal to or greater than a threshold value when performing communication via communication network 2 are set as main units.

In server device 20, data acquisition unit 21 acquires data transmitted from first wireless communication unit 11b of aerial vehicle 10b. This data includes, for example: identification information of aerial vehicle 10b; information indicating the flight status of aerial vehicle 10 including the position (including latitude, longitude, and altitude), flight direction, and flight speed; information pertaining to the drive status of aerial vehicle 10 such as the rotation speed of flight device 1008 of aerial vehicle 10b, and values pertaining to input/output of current, voltage or the like; data generated in aerial vehicle 10b (imaging data and/or sensing data described above); and information acquired by aerial vehicle 10b from other aerial vehicles 10a and 10c. The information acquired by aerial vehicle 10b from other aerial vehicles 10a and 10c includes, for example, identification information of aerial vehicles 10a and 10c, information indicating the flight status of aerial vehicles 10a and 10c, information pertaining to the drive status of aerial vehicle 10, and data generated in aerial vehicles 10a and 10c (imaging data and/or sensing data described above).

In server device 20, plan acquisition unit 22 acquires flight plan information pertaining to each of aerial vehicles 10. This flight plan information includes identification information of aerial vehicle 10, a flight path in which the planned positions of the flight of aerial vehicle 10 are connected, and a flight period of the planned flight through each of these positions. The flight plan information is associated with flight plan identification information that identifies each flight plan and is stored, for example, in a storage 2003 of server device 20 or a storage device (not illustrated) that is connected to server device 20. Plan acquisition unit 22 acquires, from these storage means, the flight plan information pertaining to an aerial vehicle 10.

In server device 20, communication quality acquisition unit 23 acquires communication quality information pertaining to the communication quality of wireless communication via communication network 2. This communication quality information is mapping information representing communication quality in each position and period, and is stored, for example, in storage 2003 of server device 20 and/or a storage device (not illustrated) connected to server device 20. Communication quality acquisition unit 23 acquires, from these storage means, communication quality information corresponding to an arbitrary position and period. This communication quality information may be obtained statistically from the results of actual measurements of communication quality in each past position and each past period, or may be obtained by means of simulation analysis from the position or past output data of each base station of communication network 2. In the light of this communication quality information, server device 20 is able to estimate future positions, periods and communication quality.

Setting unit 24 performs the setting of each of the operating modes of a plurality of aerial vehicles 10 on the basis of communication quality information of the planned route of the plurality of aerial vehicles 10 that fly in a group. Specifically, setting unit 24 firstly specifies the planned positions and periods in which each aerial vehicle 10 is to fly, from the flight plan information of the plurality of aerial vehicles 10 that fly in a group. Next, setting unit 24 specifies the communication quality of first wireless communication unit 11 of each aerial vehicle 10 in each position and each period, from the communication quality information that represents the communication quality in the specified positions and periods. Then, setting unit 24 specifies an operating mode setting schedule of the main unit mode and auxiliary unit mode, which sets an aerial vehicle 10 having a specified communication quality that is equal to or greater than a threshold value from among the plurality of aerial vehicles 10 as the main unit, and sets the remaining aerial vehicles 10 as auxiliary units. If a plurality of aerial vehicles 10 having a communication quality that is equal to or greater than a threshold value exist, the aerial vehicle 10 having the greatest remaining battery power is set as the main unit. This operating mode setting schedule includes information specifying the operating mode of each aerial vehicle 10 in each position and each period. Accordingly, the future operating mode of each aerial vehicle 10 is set for each position and period included in the flight plan before commencement of the flight. When flight commences, each aerial vehicle 10 switches its own operating mode in compliance with a command from server device 20 based on the operating mode setting schedule.

During the switching of the main unit, the following data exchange is performed between the main unit prior to switching (first flying body) and the main unit after switching (second flying body). Specifically, collected data to be transmitted by first aerial vehicle 10 from other aerial vehicles 10 (including second aerial vehicle 10) to server device 20 before the main unit is switched from first aerial vehicle 10 to second aerial vehicle 10, is transmitted from first aerial vehicle 10 to second aerial vehicle 10 after the main unit is switched from first aerial vehicle 10 to second aerial vehicle 10. Second aerial vehicle 10 transmits data received from the first aerial vehicle to server device 20. Moreover, second aerial vehicle 10 transmits, to server device 20, data collected from another aerial vehicle 10 (includes first aerial vehicle 10) after the switching of the main unit. Accordingly, deletion of data to be transmitted to server device 20 before/after the switching of the main unit is avoided.

However, the flight of any of aerial vehicles 10 may deviate from the contents of the flight plan information after commencement of the flight of the plurality of aerial vehicles 10. For example, if a malfunction or a fault occurs in an aerial vehicle 10, that aerial vehicle 10 may fly in positions or periods that deviate from the positions or periods determined by the flight plan information. If, for instance, a malfunction or a fault such as that described above occurs in an aerial vehicle 10 that was determined by the operating mode setting schedule to operate in main unit mode, that aerial vehicle 10 flies in different positions or periods to the positions and periods determined by the flight plan information, and thus may not be capable of performing wireless communication via communication network 2 at a communication quality suited to operation in main unit mode.

Accordingly, with regards to aerial vehicle 10 operating in main unit mode, if it has been determined that the flight of that aerial vehicle 10 satisfies conditions indicating possibility of deviation from the contents of the flight plan information, setting unit 24 determines, on a case-by-case basis, whether to modify the setting of the operating mode of that aerial vehicle 10, regardless of the contents of the operating mode setting schedule. Specifically, if, from among aerial vehicles 10 that fly in a group, excluding aerial vehicles 10 that satisfy the condition of possible deviation from the contents of the flight plan information, an aerial vehicle 10 having a communication quality of first communication unit 11 that is equal to or greater than a threshold value in the planned flight positions and flight periods exists, setting unit 24 determines that setting of the operating mode is to be modified. At this time, if a plurality of aerial vehicles 10 having a communication quality that is equal to or greater than a threshold value exist, the aerial vehicle 10 having the maximum remaining battery power is set as the main unit. Meanwhile, if, from among aerial vehicles 10 that fly in a group, excluding aerial vehicles 10 that satisfy the condition of possible deviation from the contents of the flight plan information, an aerial vehicle 10 having a communication quality of first communication unit 11 that is equal to or greater than a threshold value in the planned flight positions and flight periods does not exist, setting unit 24 determines that setting of the operating mode is not to be modified.

Moreover, if it has been determined that the setting of the operating mode of aerial vehicle 10 is to be modified, setting unit 24 sets the operating mode of aerial vehicle 10 that was operating as the main unit in the past from main unit mode to auxiliary unit mode, and sets, the operating mode of one aerial vehicle 10 selected as a future main unit from among one or more aerial vehicles performing wireless communication via second wireless communication unit 12 with the aerial vehicle 10 for which the operating mode was set from main unit mode to auxiliary unit mode, from auxiliary unit mode to main unit mode.

Processing unit 25 performs some kind of process using data generated in aerial vehicle 10 and acquired by data acquisition unit 21 (imaging data and/or sensing data). This process includes accumulation, processing, editing, analyzing, outputting, and the like of data.

Operation

The following is an explanation of the operation of server device 20. In the following explanation, if server device 20 is disclosed as the main body of processing, specifically, processor 2001 performs an operation by having hardware such as processor 2001 and memory 2002 read a predetermined software (program), and processing is executed by controlling communication by communication device 2004 and/or reading and/or writing of data from/to memory 2002 and storage 2003. The same applies to aerial vehicle 10.

Figure 5:
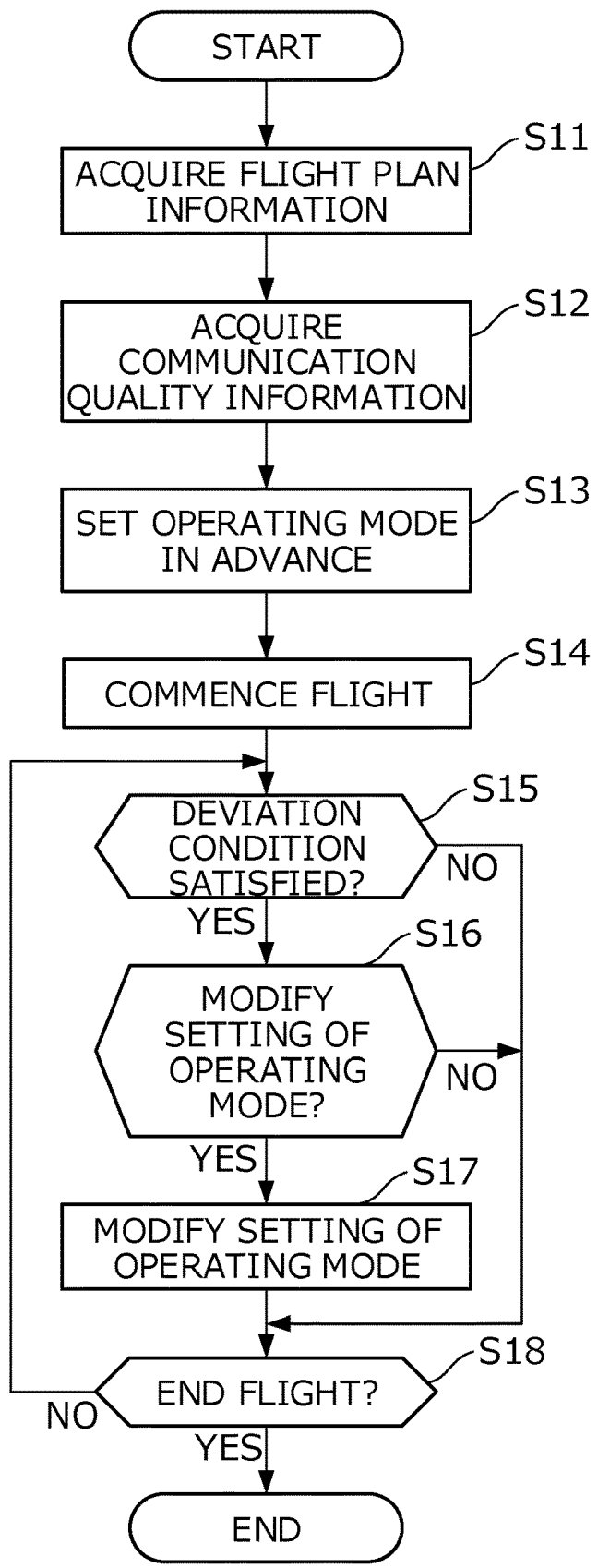
FIG. 5 is a flow chart illustrating one example of the operation of a server device according the present invention.

In FIG. 5, plan acquisition unit 22 of server device 20 acquires the flight plan information of each of aerial vehicles 10 that fly in a group (step S11).

Next, communication quality acquisition unit 23 of server device 20 acquires communication quality information corresponding to the positions and periods included in the flight plan information acquired by plan acquisition unit 22 (step S12).

Next, setting unit 24 of server device 20 performs preliminary setting of each operating mode of a plurality of aerial vehicles 10 that fly in a group, on the basis of communication quality information acquired by communication quality acquisition unit 23 (step S13). That is, setting unit 24 specifies the planned flight positions and flight periods of each aerial vehicle 10 from the flight plan information of a plurality of aerial vehicles 10 that fly in a group, and specifies the communication quality of first wireless communication unit 11 of each aerial vehicle 10 in each of the positions and periods from the communication quality information that represents the communication quality in the specified positions and periods. Then, setting unit 24 specifies an operating mode setting schedule, which sets an aerial vehicle 10 having a specified communication quality that is equal to or greater than a threshold value from among the plurality of aerial vehicles 10, and sets the remaining aerial vehicles 10 as auxiliary units.

Next, setting unit 24 of server device 20 recognizes that flight of the plurality of aerial vehicles 10 has commenced, in the light of a flight commencement notification or the like from a main unit included in the plurality of aerial vehicles 10 (step S14). Thereafter, the main unit receives, from each auxiliary unit via second wireless communication unit 12, identification information of an auxiliary unit, information indicating the flight status of an auxiliary unit, information pertaining to the drive status of an auxiliary unit, and data generated in an auxiliary unit (the imaging data and/or sensing data described above). Furthermore, the main unit transmits, from first wireless communication unit 11 to server device 20 at predetermined timings, information acquired from an auxiliary unit, in addition to identification information of host aerial vehicle 10, information indicating the flight status of host aerial vehicle 10, information pertaining to the drive status of host aerial vehicle 10, and data generated in host aerial vehicle 10 (the imaging data and/or sensing data described above).

When the flight of the plurality of aerial vehicles 10 commences, setting unit 14 determines, with respect to the aerial vehicle 10 that is operating in main unit mode, whether or not the flight of aerial vehicle 10 satisfies a condition of possible deviation from the contents of the flight plan information (deviation condition) (step S15). Specifically, if it is recognized that the possibility of occurrence of a malfunction and/or a fault that is equal to or greater than a threshold value (first threshold value) on the basis of information pertaining to the drive status of the aerial vehicle 10 that is operating in main unit mode acquired from that aerial vehicle 10, setting unit 24 determines that there is a possibility that the flight of that aerial vehicle 10 deviates from the contents of the flight plan information (step S15: YES). Since it is common for abnormal values to be included in information pertaining to the drive status of aerial vehicle 10 prior to the occurrence of a malfunction and/or a fault in aerial vehicle 10, the relationship between the details of past malfunctions and/or faults and abnormality values included in information pertaining to the drive status of aerial vehicle 10 is analyzed by means of machine learning or the like, and the relationship between information pertaining to the drive status of aerial vehicle 10 and the possibility of the occurrence of a malfunction and/or fault is stored in storage 2003 of server device 20 as an algorithm. Setting unit 24 should obtain the possibility that the flight of aerial vehicle 10 deviates from the contents of the flight plan information according to the algorithm and compare the possibility with a threshold value. If the extent of the possibility of the deviation is less than a threshold value (step S15: NO), the process of setting unit 24 proceeds to step S18.

Next, if it is determined that the flight of aerial vehicle 10 operating in main unit mode satisfies the condition of the possibility of deviating from the flight plan information (step S15: YES), setting unit 24 determines whether to modify the setting of the operating mode (step S16). Here, if it is determined that the setting of the operating mode is not to be modified (step S16: NO), the process of setting unit 24 proceeds to step S18.

If it has been determined that the setting of the operating mode of aerial vehicle 10 operating in main unit mode is to be modified (step S16: YES), setting unit 24 modifies the setting of the operating mode (step S17). The setting details of this operating mode are notified from setting unit 24 to each aerial vehicle 10. Each aerial vehicle 10 switches its own operating mode in compliance with this notification.

The aforementioned process is repeated until the end of the flight (step S18: NO). Meanwhile, processing unit 25 of server device 20 performs a process using data generated in aerial vehicle 10 and acquired by data acquisition unit 21 (imaging data and/or sensing data).

According to the present embodiment described above, the operating mode of each aerial vehicle 10 can be suitably controlled in accordance with the communication quality information that is grasped in advance, when any of a plurality of aerial vehicles 10 collects data from another aerial vehicle 10 and transmits the data.

MODIFIED EXAMPLES

The present invention is not limited to the above-described embodiment. The above-described embodiment may be modified as follows. Moreover, two or more of the following modified examples may be combined.

Modified Example 1

The control device that performs control pertaining to the setting of the operating mode may be mounted on server device 20 as exemplified in the embodiment, or may be mounted on each of aerial vehicles 10. If the control device is mounted on each of aerial vehicles 10, the aerial vehicle 10 that is operating in main unit mode performs control of the control device. Moreover, the functions of the control device pertaining to the present invention may be provided by being distributed among a plurality of devices.

Modified Example 2

In the above-described embodiment, the condition for the possible deviation of the flight of aerial vehicle 10 operating in main body mode from the flight plan information is the occurrence of a malfunction and/or a fault, but the condition is not limited to the example in the embodiment. The condition may be, for example, the occurrence of an obstacle in relation to the flight of aerial vehicle 10 in the flight space thereof. This obstacle is, for example, an object or a phenomenon that is present in the flight space of aerial vehicle 10 and that obstructs the flight of aerial vehicle 10, such as wind, rain, snow, a bird, or a flying object. Here, an airspace is each divided space of all of the space eligible for aerial vehicle 10 to fly through divided according to predetermined rules. If the obstacle is wind, the wind speed and/or direction should be detected by a device that presents the weather forecast or a pressure pattern diagram, or an anemometer installed on the ground, and server device 20 should acquire the detection results thereof. If the obstacle is rain or snow, the status of the rain/snow should be detected by a device that presents the weather forecast or a pressure pattern diagram, or rainfall/snowfall meter installed on the ground, and server device 20 should acquire the detection results thereof. If the obstacle is a bird or a flying object, the status thereof should be detected, for example, using an imaging device that captures an airspace and recognizes the presence of a bird or a flying object using image recognition, and server device 20 should acquire the detection results thereof. This imaging device may be mounted on aerial vehicle 10. Setting unit 24 of server device 20 determines the obstacle level with respect to the flight of aerial vehicle 10 on the basis of these detection results, and if the level is equal to or greater than a threshold value, determines that the condition of possible deviation of the flight of aerial vehicle 10 operating in main unit mode from the flight plan information (deviation condition) is satisfied.

Modified Example 3

The condition of possible deviation of the flight of aerial vehicle 10 operating in main unit mode from the flight plan information may be the occurrence of an obstacle with respect to communication performed by first wireless communication unit 11 of aerial vehicle 10 in the flight space of aerial vehicle 10. An obstacle with respect to communication performed by first wireless communication unit 11 may be caused by interference occurring upon output control in the base station of communication network 2, for example. Specifically, uplink high-speed data transmission is performed in data transmission from aerial vehicle 10 to server device 20. Therefore, output at the time of data transmission from aerial vehicle 10 is increased, but at this time, wireless signals transmitted from aerial vehicle 10 serve as interference waves to the wireless cells of another base station in the line of sight of this aerial vehicle 10. These interference waves affect the communication quality and/or capacity of communication network 2. According to 3GPP standards, with the aim of reducing this effect, data transmission of aerial vehicle 10 that performs wireless communication via communication network 2 is sometimes limited by communication network 2. Due to this limitation, output of first wireless communication unit 11 of aerial vehicle 10 is suppressed, and as a result, data transmission from aerial vehicle 10 to server device 20 may not be realized at the desired data speed, data error rate, signal delay amount, or the like. This results in an obstacle with respect to communication performed by first wireless communication unit 11 of aerial vehicle 10. This limitation is performed in units of aerial vehicle 10 from communication network 2, and thus if aerial vehicle 10 that is subject to this limitation is operating in main unit mode, setting unit 24 of server device 20 determines that the condition of possible deviation of the flight of this aerial vehicle 10 from the flight plan information (deviation condition) is satisfied.

Modified Example 4

The condition of possible deviation of the flight of aerial vehicle 10 operating in main unit mode from the flight plan information may be the switching of the control of aerial vehicle 10 from automatic control flight (automatic control) to manual control flight (manual control). In manual control flight, the possibility of deviation of the flight of aerial vehicle 10 from the flight plan information may be increased (particularly if an unexperienced operator is operating the manual control flight) compared to that of an automatic control flight, and thus if the flight is switched from automatic control flight to manual control flight, setting unit 24 of server device 20 determines that the condition of possible deviation of the flight of aerial vehicle 10 operating in main unit mode from the flight plan information (deviation condition) is satisfied.

Modified Example 5

When aerial vehicle 10 operates in auxiliary unit mode, the aerial vehicle 10 operating in main unit mode may be identified and data from second wireless communication unit 12 may be transmitted using that aerial vehicle 10 as a destination, or data from second wireless communication unit 12 may be subject to broadcast transmission identifying the aerial vehicle 10 operating in main unit mode.

Modified Example 6

A configuration may be adopted, wherein, in an operating mode setting schedule, data to be transmitted to server device 20 is collected by second aerial vehicle 10 from other aerial vehicles 10 (including first aerial vehicle 10) before the main unit is switched from first aerial vehicle 10 to second aerial vehicle 10, and when the main unit is switched from first aerial vehicle 10 to second aerial vehicle 10, second aerial vehicle 10 transmits, to server device 20, data collected from other aerial vehicles 10 (including the first aerial vehicle body). In this case, second aerial vehicle 10 is operating in the third operating mode (referred to as before-switching data reception mode) from when data collection from other aerial vehicles 10 (including the first flying body) begins until the main unit is switched from first aerial vehicle 10 to second aerial vehicle 10. Specifically, setting unit 24 sets one or more aerial vehicles 10 from among second aerial vehicles 10 operating in auxiliary unit mode to before-switching data reception mode that receives data from other aerial vehicles 10 via second wireless communication unit 12, at a timing that is a given period prior to a period in which first aerial vehicle 10 operating in main unit mode is set to auxiliary unit mode, by issuing a command to each aerial vehicle 10 while referring to the operating mode setting schedule. At the time at which first aerial vehicle 10 operating in main unit mode is to be set to auxiliary unit mode, setting unit 24 sets first aerial vehicle operating in main unit mode to auxiliary unit mode, and sets second aerial vehicle 10 operating in before-switching data reception mode to main unit mode.

Modified Example 7

A configuration may be adopted, wherein, in an operating mode setting schedule, a group of all aerial vehicles 10 temporarily store data to be transmitted to the main unit or server device 20 before the main unit is switched from first aerial vehicle 10 to second aerial vehicle 10, and when the main unit is switched from first aerial vehicle 10 to second aerial vehicle 10, the data temporarily stored by the group of aerial vehicles is transmitted to second aerial vehicle 10. In this case, the group of aerial vehicles is operating in a fourth operating mode (referred to as before-switching data buffer mode) from when temporary storage of data to be transmitted to the main unit or server device 20 begins until the main unit is switched from first aerial vehicle 10 to second aerial vehicle 10. Specifically, before first aerial vehicle 10 being operated in main unit mode is set to auxiliary unit mode, setting unit 24 sets each aerial vehicle 10 to before-switching data buffer mode that temporarily stores data generated in host aerial vehicle 10, sets first aerial vehicle 10 being operated in main unit mode to auxiliary unit mode, sets any of the one or more second aerial vehicle 10 being operated in before-switching data buffer mode to main unit mode, and sets other second aerial vehicles 10 being operated in before-switching data buffer mode to auxiliary unit mode, by issuing a command to each aerial vehicle 10 while referring to the operating mode setting schedule.

Other Modified Examples

The block diagram used to explain the above-described embodiment illustrates functional unit blocks. These functional blocks (components) are realized by combining hardware and/or software. The method for realizing each functional block is not particularly limited. That is, each functional block may be realized using one device that is physically and/or logically bound, or may be realized by using two or more devices, which are physically or logically separated, being directly or indirectly (for example, via a wire, wirelessly etc.) connected. The functional blocks may be realized by combining software in the abovementioned one device or plurality of devices.

The functions include, but are not limited to, judging, determining, calculating, estimating, processing, deriving, investigating, searching, confirming, receiving, transmitting, outputting, accessing, solving, selecting, electing, establishing, comparing, estimating, expecting, regarding, broadcasting, notifying, communicating, forwarding, configuring, reconfiguring, allocating, mapping, assigning, and the like.

For example, a functional block (functional unit) that executes the transmission function is referred to as a transmitting unit and/or a transmitter. As described above, the realization methods thereof are not particularly limited.

For example, the server device and the like in one embodiment of the present disclosure may function as a computer that performs the process of the present disclosure.

Each mode/embodiment explained in the present disclosure may be applied to one or more of long term evolution (LTE), LTE-advanced (LTE-A), SUPER 3G, IMT-advanced, fourth generation mobile communication system (4G), fifth generation mobile communication system (5G), future radio access (FRA), new radio (NR), W-CDMA (registered trademark), GSM (registered trademark), CDMA2000, ultra mobile broadband (UMB), IEEE 802.11 (Wi-Fi (registered trademark)), IEEE 802.16 (WiMAX (registered trademark)), IEEE 802.20, ultra-wideband (UWB), Bluetooth (registered trademark), other systems that use suitable systems, and next-generation systems expanded on the basis of the aforementioned systems. Moreover, a plurality of systems may be combined (for example, combining LTE and/or LTE-A with 5G, etc.) and applied.

The order of the process steps, sequences, flowcharts, and the like of each mode/embodiment explained in the present disclosure may be interchanged, provided no specific order exists. For example, the methods explained in the present disclosure present elements of various steps using the orders thereof as examples, and the orders are not limited to the specific orders presented.

Inputted/outputted information and the like may be stored in a specific location (for example, a memory), or may be managed using a management table. Information and the like to be input/output may be overwritten, updated, or postscripted. Outputted information and the like may be deleted. Inputted information and the like may be transmitted to another device.

Determination may be performed using a value (0 or 1) represented by one bit, may be performed using Boolean (true or false), or may be performed using comparison of numerical values (for example, comparison with a predetermined value).

Each embodiment/modified example explained in the present disclosure may be used singularly or combined, or switched according to the execution thereof. Moreover, notification of predetermined information (for example, notifying "of being X") is not limited to being performed explicitly, and may be performed implicitly (for example, not notifying the predetermined information).

Above is a detailed explanation of the present disclosure, but it would be obvious to a person skilled in the art that the present disclosure is not limited to the embodiment explained in the present disclosure. The present disclosure may be embodied as corrected and modified modes without deviating from the purpose and scope of the present disclosure defined by the disclosure in the claims. Accordingly, the disclosure in the present invention aims to explain examples, and does not have a limited significance with respect to the present invention.

Software as used herein means software, firmware, middleware, microcode, or hardware description language, and may be widely interpreted as a command, command set, code, code segment, program code, program, sub-program, software module, application, software application, software package, routine, sub-routine, object, executable file, execution thread, order, function, or the like, regardless of whether another term is used. Software, instructions, information, and the like may be transmitted/received via a transmission medium. If, for example, software is transmitted from a website, a server or another remote source using wired technology (coaxial cable, optical fiber cable, twisted pair wire, digital subscriber line (DSL) or the like) and/or wireless technology (infrared rays, microwaves, or the like), the wired technology and/or wireless technology are included in the definition of a transmission medium.

Information, signals and the like in the present disclosure may be referred to in various ways. For example, data, instructions, commands, information, signals, bits, symbols, chips, and the like, may be used across the entire explanation above, and may be represented as voltages, currents, magnetic waves, magnetic fields or magnetic particles, optical fields or protons, or by any combination thereof.

The terms explained in the present disclosure and terms required to understand the present disclosure may be replaced with terms having the same or similar meanings.

Information, parameters or the like in the present disclosure may be represented using absolute values, may be represented using relative values from predetermined values, or may be represented using other corresponding information.

The wording "on the basis of" used in the present disclosure does not signify "only on the basis of", unless otherwise specified. That is to say, the wording "on the basis of" signifies both "only on the basis of" and "on the basis of at least".

The overall amount or order of various references to elements referred to as "the first", "the second" and the like in the present disclosure are not limited thereto. These references may be used in the present disclosure as methods that are useful for differentiating between two or more elements. Accordingly, references to the first and second elements do not signify that only the two elements may be adopted, or that the first element must precede the second element in some form.

The term "unit" in the configuration of each device described above may be replaced with the terms "means", "circuit", "device", or the like.

As long as the terms "include", "including" and modifications thereof are used within the present disclosure, the intention of these terms are comprehensive, similarly to the term "comprising". Moreover, the term "or" used in the present disclosure is not an exclusive or.

In the present disclosure, if, for example, an article such as "a", "an", or "the" is used, the subsequent noun may be singular or plural.

In the present disclosure, the wording "A and B differ" may signify that "A and B differ from each other". This wording may also signify that "A and B each differ from C".

The terms "separated", "connected", and the like may also be interpreted in a similar manner to the term "differs".

EXPLANATION OF THE REFERENCE NUMERALS 1 flight control system
10, 10a, 10b, 10c flying body
11, 11a, 11b, 11c first wireless communication unit
12, 12a, 12b, 12c second wireless communication unit
1001 processor
1002 memory
1003 storage
1004 first wireless communication device
1005 second wireless communication device
1006 input device
1007 output device
1008 flight device
1009 positioning device
20 server device
21 data acquisition unit
22 plan acquisition unit
23 communication quality acquisition unit
24 setting unit
25 processing unit
2001 processor
2002 memory
2003 storage
2004 communication device
2005 input device
2006 output device

The invention claimed is:

1. A control device comprising:
   a setting unit configured to set, for each of aerial vehicles, an operating mode of an aerial vehicle to a first operating mode or a second operating mode, the aerial vehicle comprising a first wireless communication unit configured to perform wireless communication via a communication network and a second wireless communication unit configured to perform wireless communication without use of the communication network, the first operating mode being an operating mode in which the aerial vehicle sends data generated in the aerial vehicle and data received from another aerial vehicle, by use of the second wireless communication unit, to a data processing device by use of the first wireless communication unit, the second operating mode being an operating mode in which the aerial vehicle sends, by use of the second wireless communication unit, data generated in the aerial vehicle to another aerial vehicle;
   a plan acquisition unit configured to acquire, for each of the aerial vehicles, flight plan information indicative of a planned flight location and a planned flight time; and
   a communication quality acquisition unit configured to acquire, for each of sets of a location and a time, communication quality information indicative of a quality of wireless communication using the communication network, wherein the setting unit is configured to set, for each of the aerial vehicles, an operating mode of an aerial vehicle to the first operating mode or the second operating mode based on communication quality information that corresponds to flight plan information acquired for the aerial vehicle.

2. The control device according to claim 1, wherein the setting unit is configured, when determining that an aerial vehicle operating in the first operating mode satisfies a condition for possible deviation of flight of the aerial vehicle from flight plan information acquired for the aerial vehicle, to determine whether to change an operating mode of the aerial vehicle.

3. The control device according to claim 2, wherein the condition is that the aerial vehicle operating in the first operating mode has a malfunction or a failure.

4. The control device according to claim 2, wherein the condition is that the aerial vehicle operating in the first operating mode has a problem with flight in an airspace prepared for the aerial vehicle.

5. The control device according to claim 2, wherein the condition is that the aerial vehicle operating in the first operating mode has a problem with communication using a first wireless communication unit of the aerial vehicle in an airspace prepared for the aerial vehicle.

6. The control device according to claim 2, wherein the condition is that a method of controlling the aerial vehicle operating in the first operating mode has been changed from automatic control to manual control.

7. The control device according to claim 1, wherein the setting unit is configured to:
before setting an operating mode of a first aerial vehicle operating in the first operating mode to the second operating mode, set an operating mode of a second aerial vehicle operating in the second operating mode to a third operating mode in which the second aerial vehicle receives data from another aerial vehicle by use of second wireless communication unit of the second aerial vehicle;
setting the operating mode of the first aerial vehicle operating in the first operating mode to the second operating mode; and
setting the operating mode of the second aerial vehicle operating in the third operating mode to the first operating mode.

8. The control device according to claim 1, wherein the setting unit is configured to:
before setting an operating mode of a first aerial vehicle operating in the first operating mode to the second operating mode, set each of operating modes of second aerial vehicles to a fourth operating mode in which each of the second aerial vehicles temporarily stores data generated in each of the second aerial vehicles;
setting the operating mode of the first aerial vehicle operating in the first operating mode to the second operating mode;
setting an operating mode of one of the second aerial vehicles operating in the fourth operating mode to the first operating mode; and
setting an operating mode of another one of the second aerial vehicles operating in the fourth operating mode to the second operating mode.

9. A non-transitory computer-readable medium storing a program that causes a computer to execute instructions to function as:
a setting unit configured to set, for each of aerial vehicles, an operating mode of an aerial vehicle to a first operating mode or a second operating mode, the aerial vehicle comprising a first wireless communication unit configured to perform wireless communication via a communication network and a second wireless communication unit configured to perform wireless communication without use of the communication network, the first operating mode being an operating mode in which the aerial vehicle sends data generated in the aerial vehicle and data received from another aerial vehicle by use of the second wireless communication unit to a data processing device by use of the first wireless communication unit, the second operating mode being an operating mode in which the aerial vehicle sends, by use of the second wireless communication unit, data generated in the aerial vehicle to another aerial vehicle;
a plan acquisition unit configured to acquire, for each of the aerial vehicles, flight plan information indicative of a planned flight location and a planned flight time; and
a communication quality acquisition unit configured to acquire, for each of sets of a location and a time, communication quality information indicative of a quality of wireless communication using the communication network, wherein the setting unit is configured to set, for each of the aerial vehicles, an operating mode of an aerial vehicle to the first operating mode or the second operating mode based on communication quality information that corresponds to flight plan information acquired for the aerial vehicle.

10. A control method comprising:
acquiring, for each of aerial vehicles, flight plan information indicative of a planned flight location and a planned flight time, each of the aerial vehicle comprising a first wireless communication unit configured to perform wireless communication via a communication network and a second wireless communication unit configured to perform wireless communication without use of the communication network;
acquiring, for each of sets of a location and a time, communication quality information indicative of a quality of wireless communication using the communication network;
setting, for each of the aerial vehicles, an operating mode of an aerial vehicle to the first operating mode or the second operating mode based on communication quality information that corresponds to flight plan information acquired for the aerial vehicle, wherein:
the first operating mode is an operating mode in which an aerial vehicle sends data generated in the aerial vehicle and data received from another aerial vehicle by use of a second wireless communication unit of the aerial vehicle to a data processing device by use of a first wireless communication unit of the aerial vehicle; and
the second operating mode is an operating mode in which an aerial vehicle sends, by use of a second wireless communication unit of the aerial vehicle, data generated in the aerial vehicle to another aerial vehicle.

* * * * *